Figure 4:
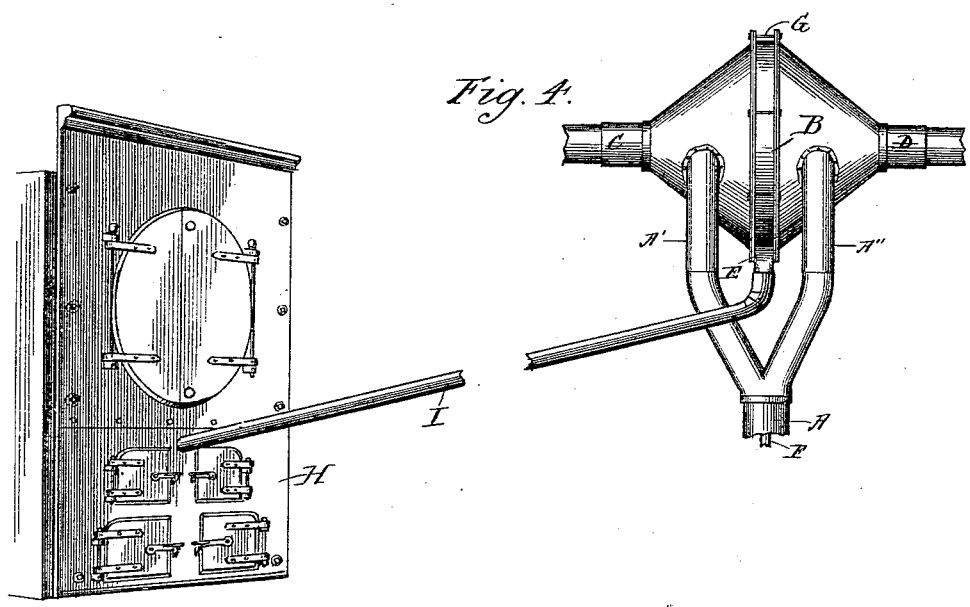

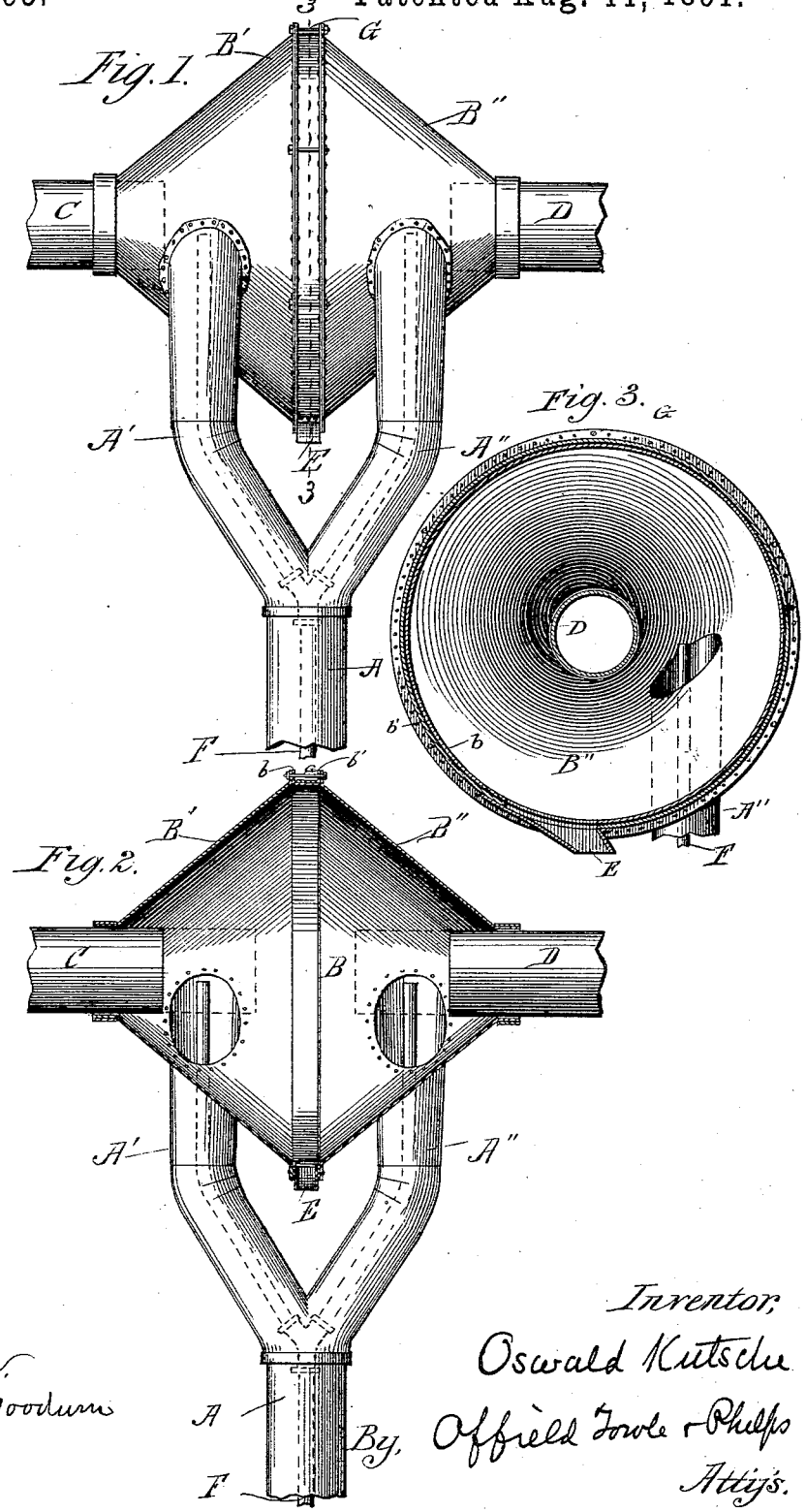

(No Model.) 2 Sheets—Sheet 2.

O. KUTSCHE.
DUST COLLECTOR.

No. 457,493. Patented Aug. 11, 1891.

Witnesses,
L. T. Mann
Frederick F. Goodwin

Inventor,
Oswald Kutsche
By Offield Towle & Phelps
Attys.

UNITED STATES PATENT OFFICE.

OSWALD KUTSCHE, OF CHICAGO, ILLINOIS, ASSIGNOR, BY MESNE ASSIGNMENTS, TO THE ALLINGTON & CURTIS MANUFACTURING COMPANY, OF MICHIGAN.

DUST-COLLECTOR.

SPECIFICATION forming part of Letters Patent No. 457,493, dated August 11, 1891.

Application filed October 11, 1886. Serial No. 215,945. (No model.)

*To all whom it may concern:*

Be it known that I, OSWALD KUTSCHE, a citizen of the United States, residing at Chicago, in the county of Cook and State of Illinois, have invented a new and useful Dust-Collector, which I desire to protect by Letters Patent of the United States, and of which the following is a specification.

My invention relates to devices for separating dust from air in mills, factories, &c., and has for its object the accomplishment of such separation in a simpler, more practical, and inexpensive manner than has heretofore been done.

It is the object of my present invention to provide means for increasing the specific gravity of the finer dust-particles during the process of separation, whereby a more effectual separation may be made, and whereby also the separated dust is rendered fit for fuel, and I propose to accomplish this by moistening the particles of dust in the air-current either by the use of steam or water, which will have two effects: First, it will increase the relative weight of the dust-particles, causing them to pass more completely to the exterior of the air-current, and when they have reached that position to drop more readily to the exit-opening. Second, it will cause the dust-particles to cling to a certain extent to the walls against which the current is driven and entirely prevent their rebound into the body of the air-current. The adhesion of the finer particles to the wall, however, will be only temporary, as they will be scraped off and pushed on by the larger moving particles as the latter impinge against the wall.

It will be observed that this invention has peculiar applicability to dust-collectors for wood-working factories and similar establishments where the fine dust is mingled with quantities of larger material collected and discharged through the dust-pipes.

In the drawings annexed, which form a part of this specification, Figure 1 is a perspective, and Fig. 2 a central vertical section, of a dust-collector which I have devised to carry out my invention. Fig. 3 is a cross-section on line 3 3, Fig. 1. Fig. 4 is a side elevation of a dust-separator, showing a pipe whereby it is connected to a furnace, the front of the latter being shown in perspective.

The dust-laden air is delivered through a main pipe A and its branches A' A'' to a double-cone-shaped chamber B, at the two apices of which are discharge-pipes C and D for the purified air, and at its base a vent-orifice E for the dust and other material to be separated from the air in the chamber. The pipes A' A'' are so fitted to the walls of the chamber that the dust-laden air as it enters has a tangential motion, and therefore circles about the wall of the chamber, completing one or more full revolutions before it passes out through the air-pipes C and D. While it is undergoing these revolutions the dust and other waste which it contains is massed by centrifugal force against the curved wall of the chamber. As the mass moves rapidly around it has a tendency to approach the center of the chamber, because of the greater diameter of the latter at that point, and when it reaches the center it is projected out through the vent-orifice E, the purified air meanwhile passing out through the pipes C and D. The tendency of centrifugal force to direct the mass to the vent-orifice is doubtless assisted also by the gravity of the waste itself. Such of the dust as adheres to the walls is scraped off and pushed on by the larger mass toward the orifice.

Steam is introduced through the pipe F, a branch of which enters each of the branches of the main pipe. The manner in which steam or water is introduced into the chamber B, however, is quite immaterial to the invention. The steam-pipes may enter the chamber directly through its walls, or they may merely enter the main pipe without being continued to its junction with the chamber B; or, instead of steam, water may be drawn up by the moving air through the main pipe.

The chamber B is formed of two conical pieces B' and B'', flanged at their bases, between which are placed two overlapping circular pieces of angle-iron b and b', the whole being held together by bolts G, passing through the flanges.

In Fig. 4 I have illustrated a part of my invention not heretofore referred to, but which is of great practical importance. It has hitherto been considered necessary in factories to have a shavings or dust room, to which waste of the kind referred to in this application is carried and allowed to remain until the dust settles thoroughly and it can be removed and disposed of. Much labor and expense would be saved if the waste could be delivered directly to the furnaces of the establishment and consumed as fuel. This, however, has been considered impracticable for two reasons: First, some sorts of dust in their dry state are explosive, and therefore can not be burned, and, second, the large amount of air which would be required to force the waste by air-pressure into the furnace would interfere with the proper combustion of the fuel in the furnace. I overcome these two obstacles by moistening the dust-particles and removing their explosive properties and by substituting to a certain extent momentum developed from centrifugal force for air-pressure to force the waste into the furnace. I am thus enabled to feed the waste to the furnace without forcing into the latter an undue amount of air. In the drawings the connection between the separating-chamber B and the furnace H is made by the pipe I. It is an advantage, both when the apparatus is used merely as a dust separator or collector and when it is used to feed the furnace, to make the discharge-pipes C and D adjustable, so that they can be pushed in and out, as shown by the broken lines in Figs. 1 and 2 of the drawings, in order that in the one case the pressure of air in the separating-chamber and in the other the pressure also in the feed-pipe may be regulated. I can thus, by adjusting the discharge-pipes, accurately regulate the amount of force pushing the waste in the feed-pipe to the furnace, making it just sufficient to deliver it; but I do not claim herein, broadly or separately, the adjustable discharge-pipes, as this feature is made the subject of claim in my application, Serial No. 215,947, now pending.

I have shown the rotary motion developed by the momentum of the air column. An equivalent of this would be the well-known fan or beaters in the separating-chamber itself. I limit myself to no particular means for producing the rotary motion of the air column.

Having thus described my invention, what I claim, and desire to protect by Letters Patent, is—

1. The combination, with a delivery-pipe for dust-laden air, a separating-chamber having curved walls into which said pipe debouches and being provided with an air-outlet and a dust-discharge pipe, of delivery-pipes for steam or water, substantially as described.

2. The combination of a delivery-pipe for dust-laden air, a chamber having curved walls into which said pipe debouches, said chamber being provided also with an air-outlet, delivery-pipes for steam or water, a furnace, and a feed-pipe leading from the said chamber to the furnace, substantially as and for the purpose set forth.

3. The combination of a delivery-pipe for dust-laden air, a separating-chamber having curved walls, a furnace, a feed-pipe extending from the chamber to the furnace, delivery-pipes for water or steam, and an air-outlet pipe adjustable in and out to regulate the pressure in the feed-pipe, substantially as and for the purpose set forth.

OSWALD KUTSCHE.

Witnesses:
FREDERICK C. GOODWIN,
E. L. HUBER.